United States Patent
Okano et al.

(10) Patent No.: US 7,415,183 B2
(45) Date of Patent: Aug. 19, 2008

(54) SILICA BASED GLASS WAVEGUIDE AND OPTICAL MODULE USING THE SAME

(75) Inventors: Hiroaki Okano, Tokyo (JP); Seiichi Kashimura, Tokyo (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 10/293,937

(22) Filed: Nov. 14, 2002

(65) Prior Publication Data

US 2003/0142942 A1 Jul. 31, 2003

(30) Foreign Application Priority Data

Nov. 14, 2001 (JP) ............... 2001-349163

(51) Int. Cl.
*G02B 6/10* (2006.01)
(52) U.S. Cl. ............... 385/129; 385/128; 385/123; 385/124; 385/132; 385/14; 385/24
(58) Field of Classification Search ............ 385/129, 385/124, 123, 128, 24, 132, 14; 501/54; 257/200; 372/57; 428/426; 65/378
See application file for complete search history.

(56) References Cited

U.S. PATENT DOCUMENTS

| | | | | |
|---|---|---|---|---|
| 4,298,245 | A * | 11/1981 | Aulich et al. | 385/123 |
| 5,526,449 | A * | 6/1996 | Meade et al. | 385/14 |
| 5,790,315 | A | 8/1998 | Fujinoki et al. | |
| 5,841,919 | A * | 11/1998 | Akiba et al. | 385/14 |
| 5,949,945 | A * | 9/1999 | Okano et al. | 385/132 |
| 6,333,284 | B1 | 12/2001 | Otsuka et al. | 501/54 |
| 6,480,518 | B1 * | 11/2002 | Fujinoki et al. | 372/57 |
| 6,501,896 | B2 * | 12/2002 | Nara et al. | 385/129 |
| 6,522,822 | B2 * | 2/2003 | Huang et al. | 385/132 |
| 6,649,268 | B1 * | 11/2003 | Komine et al. | 428/426 |
| 6,672,109 | B1 * | 1/2004 | Hiraiwa | 65/378 |
| 6,678,454 | B2 * | 1/2004 | Klekamp et al. | 385/132 |
| 6,690,872 | B2 * | 2/2004 | Sasaki et al. | 385/132 |

(Continued)

FOREIGN PATENT DOCUMENTS

JP 5-181031 A 7/1993

(Continued)

OTHER PUBLICATIONS

S. Suzuki et al., "Polarisation-insensitive arrayed-waveguide grating multiplexer with $SiO_2$-on-$SiO_2$ structure," Electronics Letters, vol. 30, No. 8, Apr. 14, 1994, pp. 642-643.

(Continued)

*Primary Examiner*—Michael G. Lee
*Assistant Examiner*—Allyson N Trail
(74) *Attorney, Agent, or Firm*—Foley & Lardner LLP (57) ABSTRACT

A silica based glass waveguide having almost the same optical characteristics as designed value and an optical module using a silica based glass waveguide having excellent optical characteristics and reduced connecting loss are provided. A silica based glass waveguide is comprising a core waveguide and a clad, a core waveguide is formed rectangular in cross section and of $SiO_2$—$TiO_2$ group glass on a synthetic silica glass substrate, and a clad is formed of $SiO_2$—$B_2O_3$—$P_2O_5$ group glass or etc. on a synthetic silica glass substrate and a core waveguide. A synthetic silica glass substrate is formed of pure $SiO_2$ and having birefringence quantity less than 10 nm/cm.

8 Claims, 4 Drawing Sheets

U.S. PATENT DOCUMENTS

| | | | |
|---|---|---|---|
| 2001/0024553 A1* | 9/2001 | Nakanishi et al. | 385/94 |
| 2001/0024559 A1* | 9/2001 | Kling | 385/132 |
| 2002/0090192 A1* | 7/2002 | O'Brien et al. | 385/140 |
| 2002/0181916 A1* | 12/2002 | Won et al. | 385/132 |
| 2003/0026518 A1* | 2/2003 | Pezeshki et al. | 385/14 |
| 2003/0044151 A1* | 3/2003 | Zhong et al. | 385/129 |
| 2003/0048975 A1* | 3/2003 | Lackritz et al. | 385/14 |
| 2003/0128927 A1* | 7/2003 | Wada et al. | 385/37 |
| 2003/0198450 A1* | 10/2003 | Pafchek et al. | 385/129 |
| 2004/0146247 A1* | 7/2004 | Tsai et al. | 385/40 |
| 2004/0159855 A1* | 8/2004 | Won et al. | 257/200 |

FOREIGN PATENT DOCUMENTS

| | | |
|---|---|---|
| JP | 9-230150 A | 9/1997 |
| JP | 9-328325 A | 12/1997 |
| JP | 10-338531 A | 12/1998 |
| JP | 2000-147293 A | 5/2000 |
| JP | 2000-258601 A | 9/2000 |
| JP | 2001-042153 A | 2/2001 |
| JP | 2001-199735 A | 7/2001 |
| JP | 2001-302275 A | 10/2001 |

OTHER PUBLICATIONS

C.J. Sun et al., "Silica waveguide circuits with low polarisation dependence fabricated on silica substrates," Electronics Letters, vol. 30, No. 24, Nov. 24, pp. 2032-2034.

* cited by examiner

SILICA BASED GLASS WAVEGUIDE AND OPTICAL MODULE USING THE SAME

BACKGROUND OF THE INVENTION

1. Field of the invention

The present invention relates to a silica based glass waveguide and an optical module using the same, and more specifically to a silica based glass waveguide and an optical module using the same for use in large-capacity optical transmission system.

2. Prior Art

Recently, accompanied with propagation of technology such as internet and high speed communication between computers, developments and improvements of long distance high speed large-capacity transmission system using dense wavelength division multiplexing (DWDM) method are advancing rapidly in the worldwide scale.

In DWDM transmission system, large capacity transmission is performed by multiplexing different wavelength optical signals of 1.55 μm band width to an optical fiber by using an optical multiplexer/demultiplexer, then amplify this multiplexed optical signal collectively with an optical fiber amplifier. As a key component of this DWDM transmission system, an optical multiplexer/demultiplexer which multiplexes or demultiplexes different wavelength optical signals is indispensable.

As an optical multiplexer/demultiplexer, three types of dielectric multilayer film filter type, fiber brag grating type and arrayed waveguide grating (AWG) are put in practical use. Among them, AWG type optical multiplexer/demultiplexer comprising silica based glass waveguide is excellent with respect to mass productivity, cost and multi channeling, because it is manufactured by applying semiconductor process and optical fiber producing technique.

Figure 1:
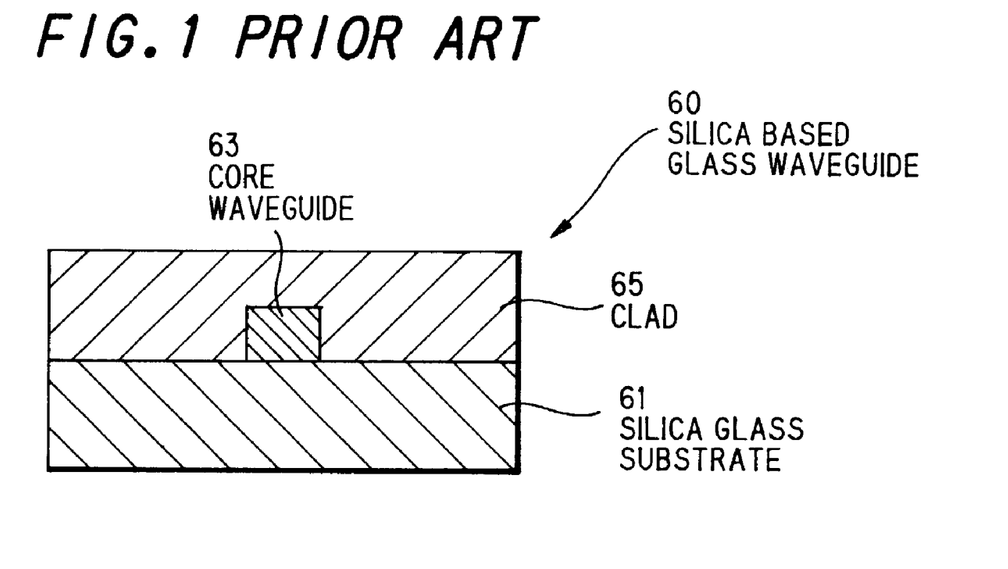
FIG. 1 is an explanatory view showing a silica based glass waveguide of a prior art.

As shown in FIG. 1, this silica based glass waveguide is manufactured as follows. A core glass film (not shown in the figure) is formed on a silica glass substrate 61. A core waveguide 63 is formed by processing such as etching to the core glass film. After a plurality of optical waveguide are formed collectively on the silica glass substrate 61 by forming a clad 65 on the surface of the silica glass substrate 61 and the core waveguide 63, they are cut off for every waveguide.

However, in the conventional silica based glass waveguide 60 shown in FIG. 1, because slight unevenness of various kinds of parameters occurs in practical production process, designed optical characteristics (designed value) and actually obtainable optical characteristics (measured value) are often different slightly. Even thought by considering the core width variation which arise under manufacturing and the small sway of refraction index which arise at the core or at the clad film neighboring the core, the measured value is largely different from the designed value, and obtained each silica based glass waveguide are uneven respectively in optical characteristics, the yield rate is not satisfactory. Accordingly, there were problems in reliability, uniformity of products and yield rate under manufacturing.

Further, there was problem that connecting loss increases when an optical module was constituted by connecting an optical fiber (not shown in the figure) to at least one end of the core waveguide 63 of the silica based glass waveguide 60.

SUMMARY OF THE INVENTION

An object of the present invention is to provide a silica based glass waveguide having almost the same optical characteristics as designed value.

Another object of the present invention is to provide an optical module using a silica based glass waveguide having excellent optical characteristics and reduced connecting loss.

The inventors of the present invention have variously examined the cause of deterioration of optical characteristics in a silica based glass waveguide, after all, they found out that birefringence of a silica glass substrate is a main factor. Further, as a result of the inventers' various examinations carried out to inquire the cause of increasing connecting losses when an optical module is constituted by connecting an optical fiber to a silica based glass waveguide, it was found out that imperfect alignment between a core waveguide and an optical fiber was caused by bend generated in a silica glass substrate.

In accordance with this invention, there is provided a silica based glass waveguide comprising a core waveguide formed on a silica glass substrate and a clad for covering said core waveguide and said silica glass substrate, wherein said silica glass substrate is synthetic silica glass substrate formed of pure $SiO_2$ and having birefringence quantity less than 10 nm/cm.

In the present invention, a silica based glass waveguide having almost the same optical characteristics as designed value is provided.

The bend of said synthetic silica glass substrate is preferably less than 1.25 μm/inch in diameter ratio of silica glass substrate.

Further, there is provided an optical module using a silica based glass waveguide by connecting an optical fiber to at least one end of a core waveguide of a silica based glass waveguide, said silica based glass waveguide is comprising a core waveguide formed on a silica glass substrate and a clad for covering said core waveguide and said silica glass substrate, said silica glass substrate is synthetic silica glass substrate formed of pure $SiO_2$ and having birefringence quantity less than 10 nm/cm.

In the present invention, an optical module using a silica based glass waveguide having excellent optical characteristics and reduced loss in connecting with an optical fiber is provided.

DESCRIPTION OF THE PREFERRED EMBODIMENTS

Preferred embodiments of the present invention will be explained in conjunction with accompanying drawings.

Figure 2:
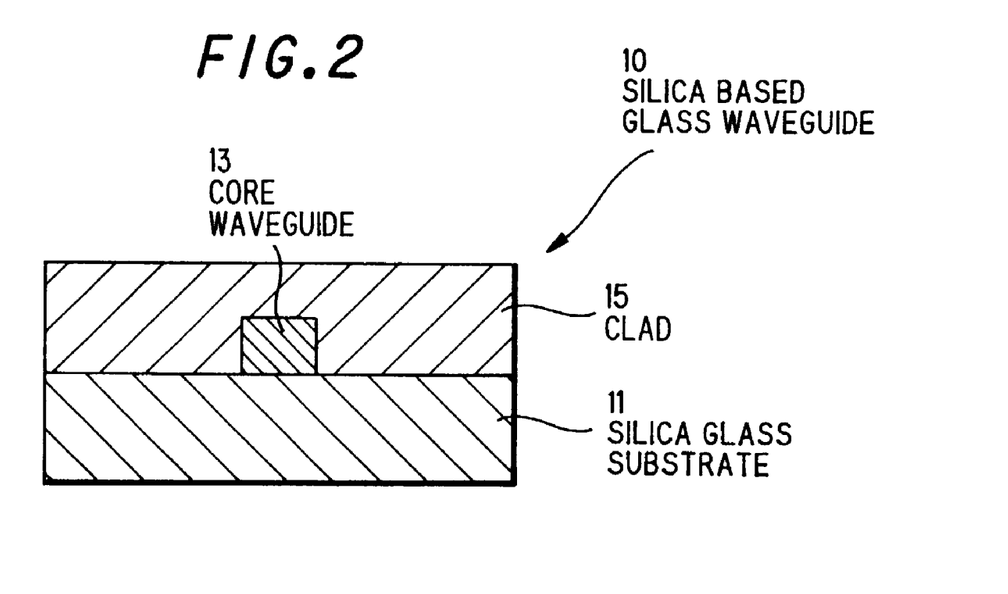
FIG. 2 is an explanatory view showing a silica based glass waveguide of one embodiment of the present invention.

As shown in FIG. 2, a silica based glass waveguide 10 in accordance with this embodiment is comprising a core waveguide 13 and a clad 15, the core waveguide 13 is formed rectangular in cross section and of $SiO_2$—$TiO_2$ group glass on the synthetic silica glass substrate (silica glass substrate) 11, and the clad 15 is formed of $SiO_2$—$B_2O_3$—$P_2O_5$ group glass or etc. on the silica glass substrate 11 and the core waveguide 13. The constituent material of the clad 15 is lower refractive index than the constituent material of the core waveguide 13, and relative refractive index difference of clad 15 in respect of the core waveguide 13 ({(refractive index of the core waveguide−refractive index of the clad)/(refractive index of the core waveguide)}×100) is 0.1-2.0%, preferably 0.5-1.0%, more preferably around 0.75%. The meaning to form the core waveguide 13 on the glass substrate 11 includes to form the core waveguide 13 over the surface of the glass substrate 11, or to form the groove state core waveguide 13 on the glass substrate 11.

The glass substrate 11 having birefringence quantity less than 10 nm/cm, preferably less than 2 nm/cm, more preferably less than 0.5 nm/cm may be applicable to the present invention. If the birefringence quantity exceeds 10 nm/cm, desired optical characteristics could not be obtained, and unevenness in optical characteristics of the obtained silica based glass waveguide would increase.

Accurate birefringence measurement of the glass substrate 11 is carried out using automatic birefringence evaluating equipment (for example, ABR—10A; UNIOPT Inc.). This automatic birefringence evaluating equipment uses optical heterodyne measuring method as a measuring principal of birefringence, and uses frequency stabilized lateral Zeeman laser (wavelength 633 nm, output power 2 mW, beam diameter $\phi 0.75$ mm ($1/e^2$)) as a light source. Birefringence of measurement sample (glass substrate 11) is measured and detected at resolving power 0.01 nm as optical phase difference, birefringence principal axis direction and birefringence quantity can be measured at the same time.

Measurement range of retardation in the automatic birefringence evaluating equipment is 0-260 nm, its resolving power is 0.01 nm, measurement range of optical phase difference is 0-150 deg., its resolving power is 0.006 deg., and measurement range of principal axis direction is 0±90 deg., its resolving power is 0.1 deg.

Birefringence quantity S is calculated from measured retardation by using following equation.

$$S = \text{(retardation)}/\text{(thickness of measured specimen)} \qquad (1)$$

For example, when measured retardation is 10 nm for specimen of 5 cm thickness, according to equation (1), birefringence quantity S is 2 nm/cm.

With respect to the glass substrate 11, the bend to its thickness direction (vertical direction in FIG. 2) is preferable as small as possible. For example, in case of silica glass substrate of 4 inch diameter, the bend to its thickness direction is preferable less than 5 μm. In other words, the bend of the glass substrate 11 to its thickness direction is preferable less than 1.25 μm/inch in diameter ratio. If the bend exceeds 1.25 μm/inch, connecting loss of optical module manufactured by using obtained every silica based glass waveguide increases.

The bend to thickness direction is defined by difference of maximum height and minimum height from this basic surface to the glass substrate 11 surface, when the glass substrate is placed on the flat standard surface. Concretely, using optical distance measuring equipment whose height (distance) from the flat standard surface is fixed, and scanning the glass substrate 11 placed on standard surface, measure the height from the standard surface to the glass substrate 11 surface, the bend of the glass substrate to thickness direction is obtained from its maximum height and minimum height.

Next, manufacturing method of silica based glass waveguide according to this embodiment will be explained.

Figure 3A:
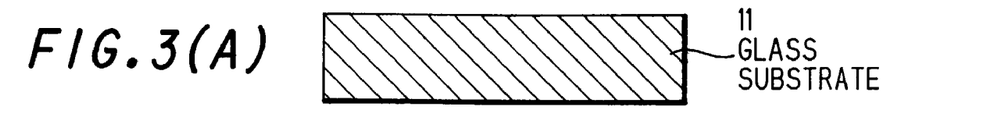
FIG. 3(A) to FIG. 3(E) are explanatory views showing the manufacturing process of a silica based glass waveguide of one embodiment of the present invention.
Figure 3B:
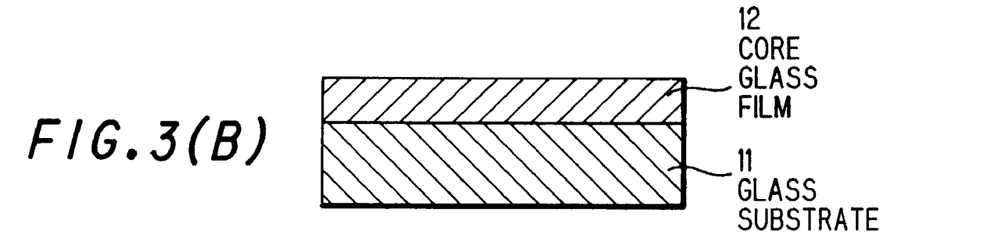
Figure 3C:
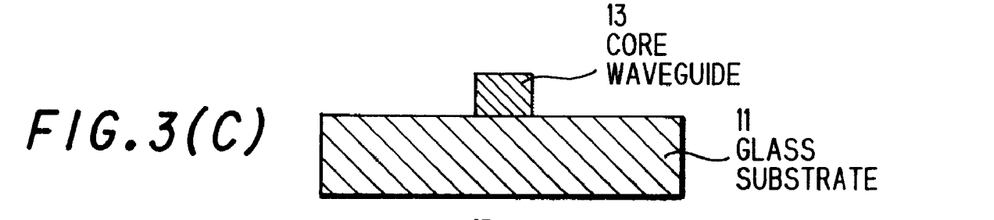

The core glass film (refer to FIG. 3(b)) 12 of $SiO_2$—$TiO_2$ is formed on the synthetic silica glass substrate 11 (refer to FIG. 3(a)) having birefringence quantity less than 10 nm/cm by electron beam vacuum evaporation. The core waveguide 13 (refer to FIG. 3(c)) is formed by processing sequentially photolithography and reactive ion etching to the core glass film 12.

Figure 3D:
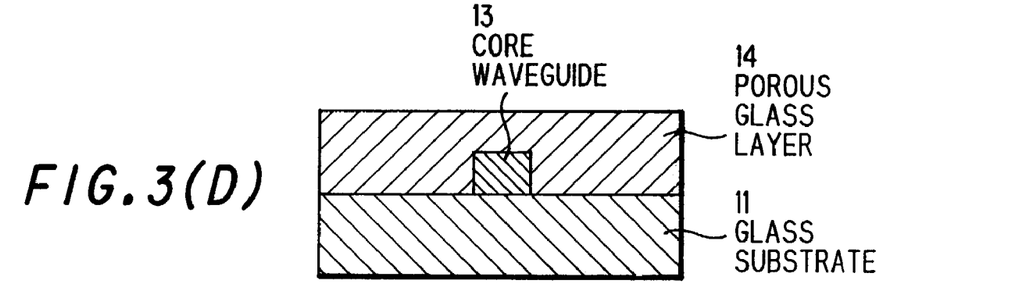

Next, $SiO_2$—$B_2O_3$—$P_2O_5$ group porous glass layer 14 (refer to FIG. 3(d)) is formed on the glass substrate 11 and the core waveguide 13 by flame deposition.

Figure 3E:
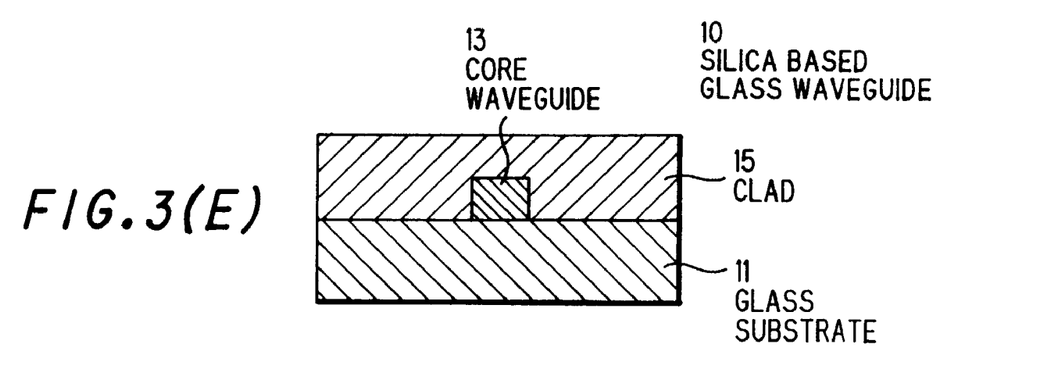

After that, moved in an electric furnace, the porous glass layer 14 is turned to transparent glass by heating over 1200° C., subsequently the clad 15 (refer to FIG. 3(e)) of $SiO_2$—$B_2O_3$—$P_2O_5$ group glass is formed.

Figure 4:
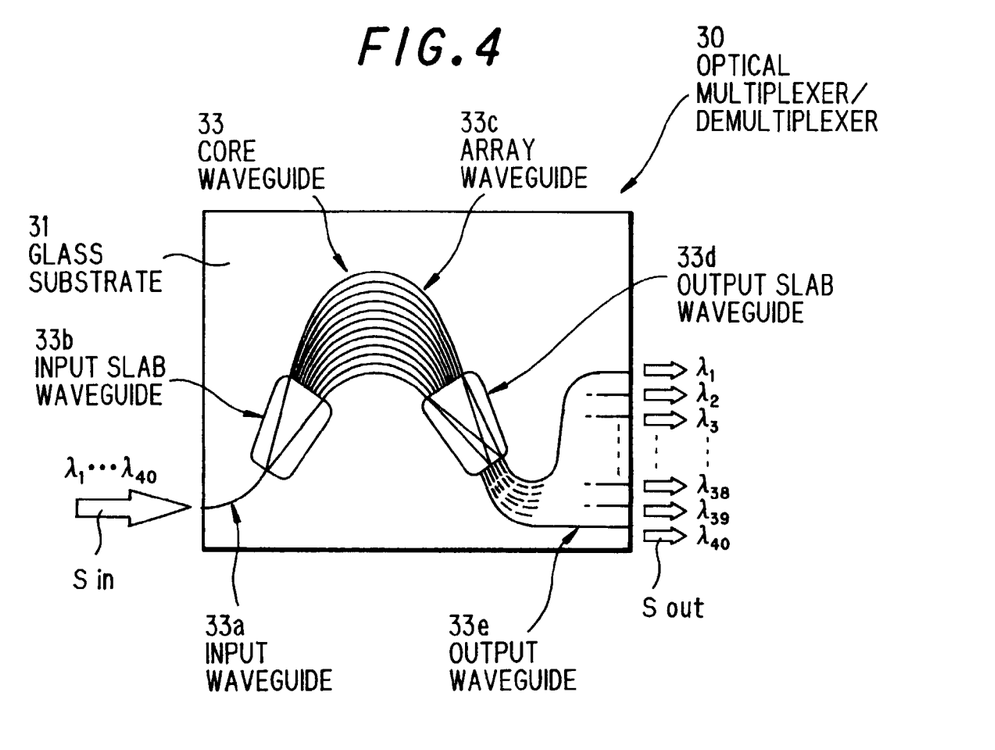
FIG. 4 is an explanatory view showing one embodiment of an optical multiplexer/demultiplexer using a silica based glass waveguide of the present invention.

Lastly, desired silica based glass waveguide, for example, forty (40) channel array waveguide-type optical multiplexer/demultiplexer 30 shown in FIG. 4 is obtained by separating each optical waveguide by dicing.

The optical multiplexer/demultiplexer 30 is comprising the core waveguide 33 (input waveguide 33a, input slab waveguide 33b, array waveguide 33c, output slab waveguide 33d and output waveguide 33e) which is formed of $SiO_2$—$TiO_2$ group glass in rectangular cross section (for example, 6 μm in width and 6 μm in height) on the separated synthetic silica glass substrate 31, and the clad (not shown in the figure) of $SiO_2$—$B_2O_3$—$P_2O_5$ group glass formed on the glass substrate 31 and core waveguide 33. Further, refractive index difference of the clad in respect of the core waveguide 33 is 0.75%.

When optical signal is demultiplexed by using this optical multiplexer/demultiplexer 30, an optical signal $S_{in}$ which multiplexed a plurality of different wavelength (wavelength $\lambda_1 \ldots \lambda_{40}$ in the figure) is input through input waveguide 33a. The input optical signal $S_{in}$ is transmitted through input slab waveguide 33b, phase difference is given by array waveguide 33c, and subsequently transmitted to output slab waveguide 33d. Because light focus position varies for every wavelength, the optical signal $S_{in}$ to which phase difference was given is demultiplexed to the optical signal $S_{out}$ of each wavelength (optical signal of wavelength $\lambda_1 \ldots$ optical signal of wavelength $\lambda_{40}$ in the figure) and output from each output waveguide 33e.

Further, an optical module (not shown in the figure) is obtained by connecting an optical fiber (not shown in the figure) to the input waveguide 33a and/or each output waveguide 33e of this optical multiplexer/demultiplexer 30.

According to the silica based glass waveguide 10 of this embodiment, by using the glass substrate 11 formed of pure $SiO_2$ and having birefringence quantity less than 10 nm/cm, the silica based glass waveguide 10 having almost the same optical characteristics as designed value is provided, and unevenness in optical characteristics of the obtained silica based glass waveguide is reduced. Accordingly, the obtained silica based glass waveguide 10 is excellent, uniform and reliable in every optical characteristics.

Further, because the obtained silica based glass waveguide 10 is excellent and uniform in every optical characteristics, reliable silica based glass waveguide 10 is manufactured with superior yield rate, subsequently manufacturing cost of a silica based glass waveguide is reduced comparing with prior art silica based glass waveguide 60 (refer to FIG. 1).

Further more, when an optical module is constituted by connecting an optical fiber (not shown in the figure) to at least one end of the core waveguide 13 of the obtained silica based glass waveguide 10, connecting loss is reduced by forming the silica based glass waveguide by using glass substrate having bend to its thickness direction is less than 5 μm, imperfect alignment between the core waveguide 13 and the optical fiber does not occur easily, namely connecting loss is reduced by accurate connecting between the core waveguide 13 and the optical fiber is provided.

Further more, comparing with the prior silica based glass waveguide 60 (refer to FIG. 1), since the silica based glass waveguide 10 of the present invention is produced cheaply, low-pricing of an optical module can be achieved.

The present invention is not limited to the above mentioned embodiment, various modifications are effective to achieve objects of the present invention. The silica based glass waveguide of the present invention is applicable, for example, to a waveguide-type matrix switch of which a plurality of waveguides formed on a glass substrate are crossing each other.

EXAMPLE 1

Figure 5:
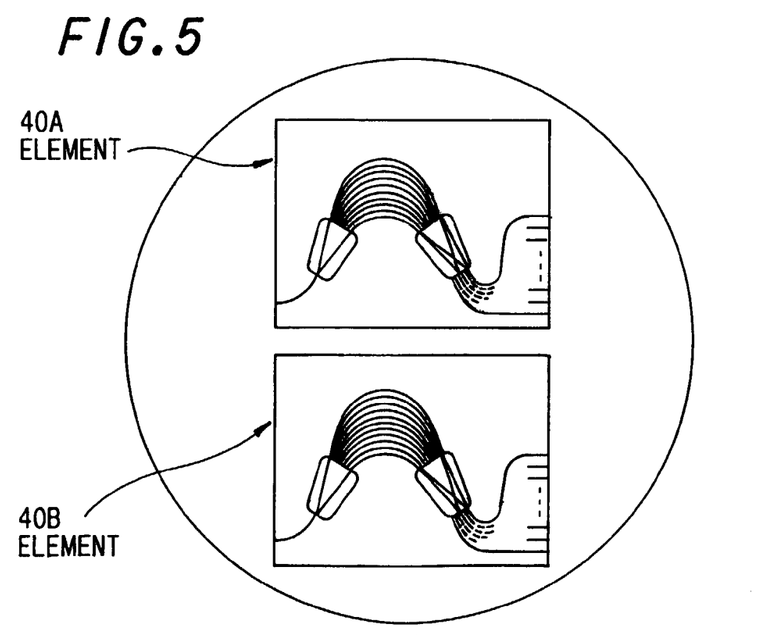
FIG. 5 is an explanatory view showing elements formed by two optical multiplexer/demultiplexers shown in FIG. 4.

As shown in FIG. 5, element 40A, 40B (samples 1, 2) are obtained by forming two optical multiplexer/demultiplexer 30 shown in FIG. 4 on the 4 inch diameter synthetic silica glass substrate having birefringence quantity about zero (0) and formed of pure $SiO_2$. The birefringence quantity is derived from the measurement by using the above automatic birefringence evaluating equipment.

EXAMPLE 2

As shown in FIG. 5, element 40A, 40B (samples 3, 4) are obtained by forming two optical multiplexer/demultiplexer 30 shown in FIG. 4 on the 4 inch diameter synthetic silica glass substrate having birefringence quantity maximum 10 nm/cm within a substrate plane and formed of pure $SiO_2$. The birefringence quantity is derived from the measurement by using the above automatic birefringence evaluating equipment.

EXAMPLE 3

As shown in FIG. 5, element 40A, 40B (samples 5, 6) are obtained by forming two optical multiplexer/demultiplexer 30 shown in FIG. 4 on the 4 inch diameter synthetic silica glass substrate having birefringence quantity maximum 2 nm/cm within a substrate plane and formed of pure $SiO_2$. The birefringence quantity is derived from the measurement by using the above automatic birefringence evaluating equipment.

EXAMPLE 4

As shown in FIG. 5, element 40A, 40B (samples 7, 8) are obtained by forming two optical multiplexer/demultiplexer 30 shown in FIG. 4 on the 4 inch diameter synthetic silica glass substrate having birefringence quantity maximum 0.5 nm/cm within a substrate plane and formed of pure $SiO_2$. The birefringence quantity is derived from the measurement by using the above automatic birefringence evaluating equipment.

COMPARATIVE EXAMPLE (PRIOR ART)

As shown in FIG. 5, element 40A, 40B (samples 9, 10) are obtained by forming two optical multiplexer/demultiplexer 30 shown in FIG. 4 on the 4 inch diameter prior art synthetic silica glass substrate.

Figure 6:
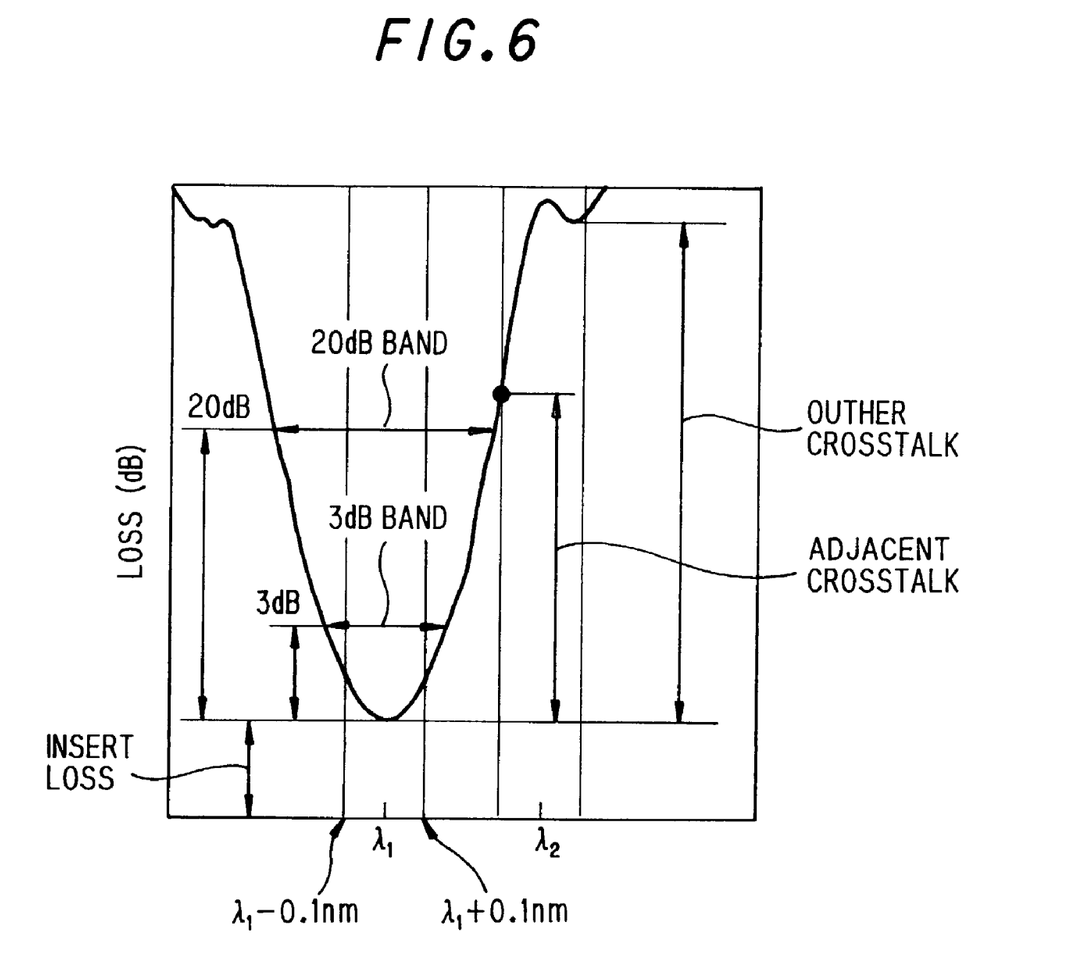
FIG. 6 is an explanatory view showing an example of typical loss—wavelength characteristic of 40 channel array waveguide-type optical multiplexer/demultiplexer.

Evaluation to loss—wavelength characteristics of each sample 1-10 is carried out as follows. In order to define parameters used in this evaluation, an example of typical loss—wavelength characteristic of 40 channel array waveguide-type optical multiplexer/demultiplexer is shown in FIG. 6. In this evaluation, as shown in FIG. 6, minimum value in pass band loss is insert loss, wavelength range of the value (insert loss +3 dB) in pass band loss is 3 dB band width, and wavelength range of the value (insert loss +20 dB) in pass band loss is 20 dB band width. Difference between loss value and insert loss at wavelength position apart±0.3 nm from the center wavelength $\lambda_1$ is defined as adjacent crosstalk which is a index showing signal leakage to the adjacent channel, and difference between insert loss and minimum loss value at region except for adjacent region is defined as other crosstalk. Results of the evaluation carried out to each sample 1-10 based on the above parameter are shown in Table 1.

TABLE 1

| | | | 3 dB band width (nm) | 20 dB bandwidth (nm) | adjacent crosstalk (dB) |
|---|---|---|---|---|---|
| | Designed value | | 0.40 | 1.00 | 30.0 |
| example | 1 | sample 1 | 0.40 | 0.955 | 28.0 |
| | | sample 2 | 0.40 | 1.00 | 28.5 |
| | 2 | sample 3 | 0.395 | 1.05 | 26.5 |
| | | sample 4 | 0.385 | 1.10 | 25.5 |
| | 3 | sample 5 | 0.401 | 1.00 | 27.5 |
| | | sample 6 | 0.395 | 1.01 | 27.0 |
| | 4 | sample 7 | 0.40 | 1.00 | 28.5 |
| | | sample 8 | 0.399 | 0.995 | 28.0 |
| comparative example | | sample 9 | 0.20 | 1.60 | 13.0 |
| | | sample 10 | 0.30 | 1.40 | 15.0 |

As shown in Table 1, since designed values of 3 dB band width, 20 dB band width and adjacent crosstalk are 0.40 nm, 1.00 nm, 30.0 dB respectively, desired optical characteristics which took measurement accuracy into consideration are more than 0.395 nm for 3 dB band width, less than 1.05 nm for 20 dB band width and more than 22 dB for adjacent crosstalk.

For samples 1-8, all samples except sample 4 are satisfied more than 0.395 nm in 3 dB bandwidth. More over, all samples except sample 4 are satisfied less than 1.05 nm in 20 dB bandwidth. More over, all samples are satisfied more than 22 dB in adjacent crosstalk. More over, samples (samples 1, 2, samples 3, 4, samples 5, 6 and samples 7, 8) obtained from the same synthetic silica glass substrate, unevenness between samples was small.

For samples 9 and 10, respective 0.20 nm and 0.30 nm for 3 dB band width, respective 1.60 nm and 1.40 nm for 20 dB band width and respective 13.0 dB and 15.0 dB for adjacent crosstalk, desired optical characteristics were not obtained. More over, even though samples 9 and 10 are obtained from the same synthetic silica glass substrate, unevenness between samples was large. This is due to following reason. Namely, the birefringence quantity measured at 100 points within a substrate plane using the automatic birefringence evaluating equipment was 0.3-27 nm/cm, the value showed remarkable unevenness in distribution and the upper value exceeded the defined value (less than 10 nm/cm) of the present invention. In addition, the measurement was carried out by using the synthetic silica glass substrate obtained from the same batch as the synthetic silica substrate for use in samples 9 and 10.

As explained above, by using synthetic silica glass substrate formed of pure $SiO_2$ and having birefringence quantity less than 10 nm/cm, an array waveguide-type optical multiplexer/demultiplexer having almost same optical characteristics as designed value is provided. In addition, optical characteristics of the provided array waveguide-type optical multiplexer/demultiplexer show small unevenness.

Next, an optical module was prepared by connecting optical fiber array to 40 output port of each sample 1-10. The optical fiber array is constituted by fixing one end of the optical fiber to the V-groove which is formed on the surface of the block at the predetermined pitch.

The bend measured for 4 inch diameter pure $SiO_2$ synthetic silica glass substrate for use in samples 1-8 was less than 1 μm (less than 0.25 μm/inch in substrate diameter ratio). Consequently, the optical module constituted by samples 1-8, connecting loss of each output port was very small such as maximum 0.15 dB.

The bend measured for 4 inch diameter synthetic silica glass substrate for use in samples 9 and 10 was 6 μm and 8 μm respectively (1.5 μm/inch and 2.0 μm/inch respectively in substrate diameter ratio), the value exceeded the defined value (less than 1.25 μm/inch in substrate diameter ratio) of the present invention. Consequently, the optical module constituted by samples 9 and 10, connecting loss of each output port was large such as 0.8 dB and 1.5 dB respectively.

As explained above, by using synthetic silica glass substrate having a bend to thickness direction less than 5 μm (less than 1.25 μm/inch in substrate diameter ratio), imperfect alignment between the output port and the optical fiber array is not easily occur, connecting loss is reduced.

Apparent from the foregoing description, excellent effects are exhibited as follows.

(1) A silica based glass waveguide having almost the same optical characteristics as designed value is obtained.
(2) An optical module using a silica based glass waveguide having excellent optical characteristics and reduced connecting loss is obtained.

What is claimed is:

1. An optical module comprising:
a silica based glass waveguide; and
an optical fiber connected to at least one end of a core waveguide of said silica based glass waveguide,
said silica based glass waveguide comprising:
a core waveguide formed on a silica glass substrate; and
a clad for covering said core waveguide and said silica glass substrate,
wherein said silica glass substrate is a synthetic silica glass substrate formed of pure $SiO_2$ and having a birefringence quantity less than 10 nm/cm,
wherein the optical fiber passes light to be transmitted by the optical module, and
wherein a majority of the light passes through the core waveguide and wherein the majority of the light does not pass through any other portion of the silica based glass waveguide.

2. An optical module according to claim 1, wherein the silica based glass waveguide has a planar shape in which a first planar layer corresponds to the silica glass substrate, a second planar layer corresponds to the clad which is provided on top of the first planar layer, and the core waveguide has a rectangular-shaped structure provided between the first and second planar layers.

3. A silica based glass waveguide comprising:
a core waveguide formed on a silica glass substrate; and
a clad for covering said core waveguide and said silica glass substrate,
wherein said silica glass substrate is a synthetic silica glass substrate formed of pure $SiO_2$ and having a birefringence quantity less than 10 nm/cm,
wherein said core waveguide is made of $SiO_2$ based glass, and
wherein a majority of light corresponding to optical signals passes through the core waveguide and wherein the majority of light does not pass through the silica glass substrate.

4. An optical module comprising:
a silica based glass waveguide; and
an optical fiber connected to at least one end of a core waveguide of said silica based glass waveguide,
said silica based glass waveguide comprising:
a core waveguide formed on a silica glass substrate; and
a clad for covering said core waveguide and said silica glass substrate,
wherein said silica glass substrate is a synthetic silica glass substrate formed of pure $SiO_2$ and having a birefringence quantity less than 10 nm/cm,
wherein said core waveguide is made of $SiO_2$ based glass, and
wherein a majority of light corresponding to optical signals passes from the optical fiber through the core waveguide and wherein the majority of light does not pass through the silica glass substrate.

5. An optical multiplexer/demultiplexer comprising:
a core waveguide formed on a silica glass substrate; and
a clad for covering said core waveguide and said silica glass substrate,
wherein said silica glass substrate is a synthetic silica glass substrate formed of pure $SiO_2$ and having a birefringence quantity less than 10 nm/cm,
wherein said core waveguide is made of $SiO_2$ based glass, and
wherein a majority of light corresponding to optical signals passes through the core waveguide and wherein the majority of light does not pass through the silica glass substrate.

6. A silica based glass waveguide comprising:
a core waveguide formed on a silica glass substrate; and
a clad for covering said core waveguide and said silica glass substrate,
wherein said silica glass substrate is a synthetic silica glass substrate formed of pure $SiO_2$ and having a birefringence quantity less than 10 nm/cm,
wherein said core waveguide is made of $SiO_2$ based glass, and
wherein the silica based glass waveguide has a planar shape in which a first planar layer corresponds to the silica glass substrate, a second planar layer corresponds to the clad which is provided on top of the first planar layer, and the core waveguide has a rectangular-shaped structure provided between the first and second planar layers.

7. An optical module comprising:
a silica based glass waveguide; and
an optical fiber connected to at least one end of a core waveguide of said silica based glass waveguide,
said silica based glass waveguide comprising:
a core waveguide formed on a silica glass substrate; and
a clad for covering said core waveguide and said silica glass substrate,
wherein said silica glass substrate is a synthetic silica glass substrate formed of pure $SiO_2$ and having a birefringence quantity less than 10 nm/cm, and
wherein the silica based glass waveguide has a planar shape in which a first planar layer corresponds to the silica glass substrate, a second planar layer corresponds to the clad which is provided on top of the first planar layer, and the core waveguide has a rectangular-shaped structure provided between the first and second planar layers.

8. An optical multiplexer/demultiplexer comprising:

a core waveguide formed on a silica glass substrate; and a clad for covering said core waveguide and said silica glass substrate, wherein said silica glass substrate is a synthetic silica glass substrate formed of pure $SiO_2$ and having a birefringence quantity less than 10 nm/cm, wherein said core waveguide is made of $SiO_2$ based glass, and wherein the optical multiplexer/demultiplexer has a planar shape in which a first planar layer corresponds to the silica glass substrate, a second planar layer corresponds to the clad which is provided on top of the first planar layer, and the core waveguide has a rectangular-shaped structure provided between the first and second planar layers.

* * * * *